(12) United States Patent
Park et al.

(10) Patent No.: US 7,937,743 B2
(45) Date of Patent: May 3, 2011

(54) METHOD AND SYSTEM FOR RAPID NETWORK APPLICATION SWITCHING

(75) Inventors: Sang-Woo Park, Seokjeok-myeon (KR); Ho-Kyun Choi, Gumi-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 956 days.

(21) Appl. No.: 11/780,144

(22) Filed: Jul. 19, 2007

(65) Prior Publication Data

US 2008/0109877 A1 May 8, 2008

(30) Foreign Application Priority Data

Nov. 7, 2006 (KR) ........................ 10-2006-0109256

(51) Int. Cl.
- G06F 17/00 (2006.01)
- G06F 7/04 (2006.01)
- G06F 15/16 (2006.01)
- G06F 17/30 (2006.01)
- H04L 29/06 (2006.01)
- H04W 4/00 (2009.01)

(52) U.S. Cl. ............. 726/1; 726/3; 713/155; 455/432.1; 455/435.1

(58) Field of Classification Search .................. 726/1, 3; 713/155; 455/432.1, 435.1
See application file for complete search history.

(56) References Cited

U.S. PATENT DOCUMENTS

| 6,990,339 | B2 | 1/2006 | Turanyi | |
|---|---|---|---|---|
| 7,130,629 | B1 | 10/2006 | Leung | |
| 2002/0188562 | A1* | 12/2002 | Igarashi et al. | 705/40 |
| 2004/0073786 | A1 | 4/2004 | O'Neill | |
| 2006/0153120 | A1* | 7/2006 | Channasamudhram | 370/328 |

FOREIGN PATENT DOCUMENTS

| KR | 1020060030994 | 4/2006 |
|---|---|---|
| KR | 1020060040270 | 5/2006 |

* cited by examiner

*Primary Examiner* — Kambiz Zand
*Assistant Examiner* — Benjamin A Kaplan
(74) *Attorney, Agent, or Firm* — H.C. Park & Associates, PLC

(57) ABSTRACT

A method for rapid application switching at a mobile station includes authenticating, in response to selection of a first application, a first network access identifier (NAI) assigned to the first application using an authentication server, registering the first NAI using a home agent, and requesting application switching by selecting a second application for execution. The method further includes deregistering, upon detection of the application switching request, the first NAI using the home agent without deactivation of protocol programs below an application layer for a period of time after deregistration, authenticating a second NAI assigned to the second application using the authentication server; and registering the second NAI using the home agent.

16 Claims, 6 Drawing Sheets

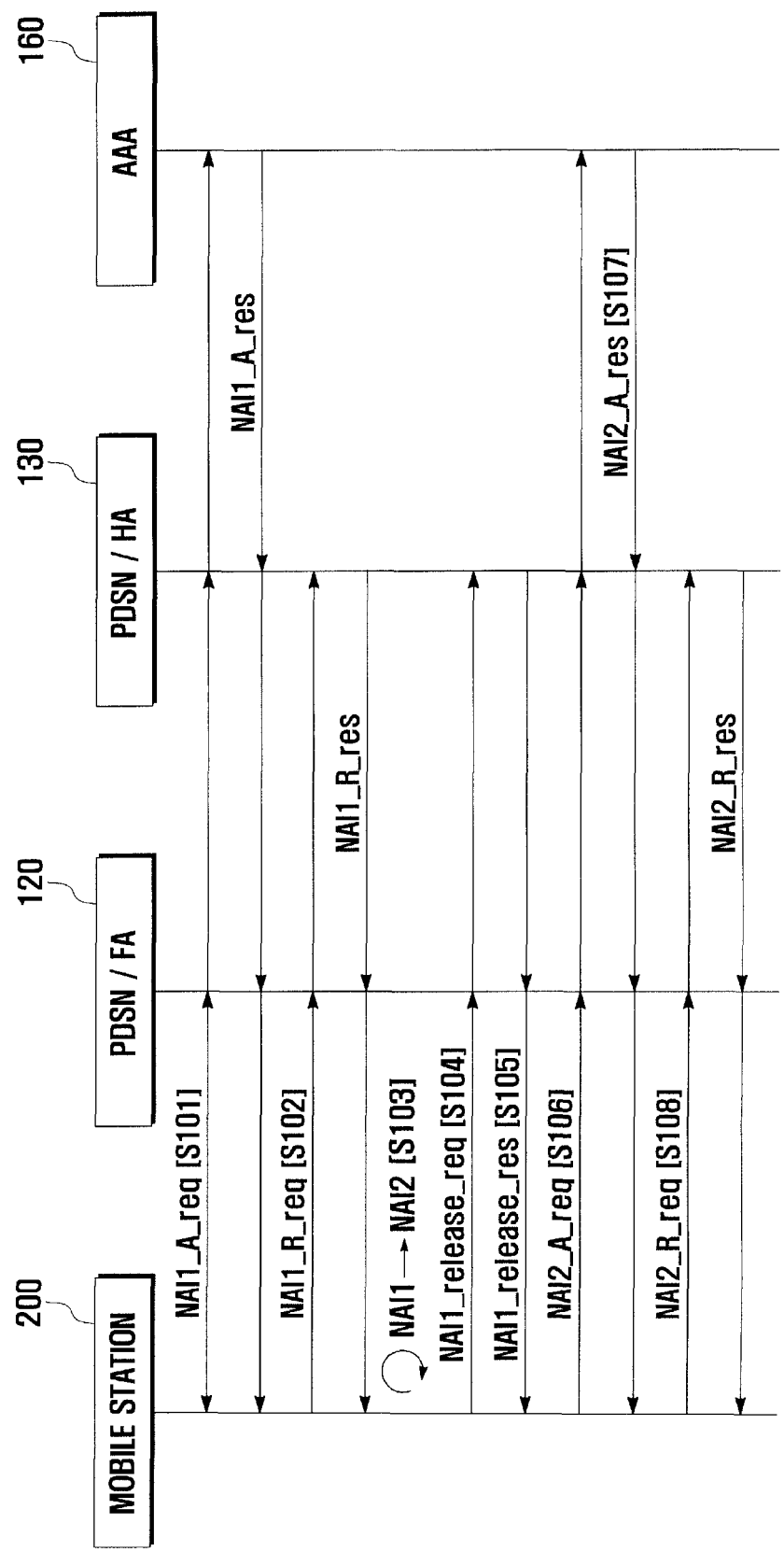

METHOD AND SYSTEM FOR RAPID NETWORK APPLICATION SWITCHING

CROSS REFERENCE TO RELATED APPLICATION

This application claims priority from and the benefit of Korean Patent Application No. 10-2006-0109256, filed on Nov. 7, 2006, which is hereby incorporated herein by reference for all purposes as if fully set forth herein.

BACKGROUND OF THE INVENTION

1. Field of the Invention

The present invention relates to a mobile station using a plurality of network access identifiers (NAI) and, more particularly, to a method and system for rapid application switching that may speed up switching between data service applications having assigned network access identifiers.

2. Discussion of the Background

A user on the move may desire his mobile station to maintain a data session with a home network. In standard wired Internet Protocol (IP) networks, hosts are assumed to be fixed and have a permanent IP address for correct routing of data packets. If a mobile station moves from the home IP network to another IP network, a new IP address must be assigned by the other IP network to the mobile station. An IP address change may interrupt an ongoing data session. To solve this problem, the Internet Engineering Task Force (IETF) has proposed Mobile IP.

Mobile IP is a communication protocol that permits a mobile station to move from one network to another while maintaining a permanent IP address. Mobile IP is an effective means for working in wired and wireless environments where users need to carry their mobile stations across multiple subnets with different IP addresses. Mobile IP may also be used in roaming areas between overlapping wireless systems.

Network access identifiers (NAI) may be used along with Mobile IP to identify users requesting access to a network. A subscriber of an access provider network may use an assigned network access identifier to access the network for an IP-based service. A network access identifier includes subscriber information and domain information, and can also be used to assist in the routing of messages requesting user authentication.

An application, which delivers an IP-based service (for example, access to the Internet) to the user, is assigned an NAI. When the user activates a first application to receive a first data service from the access provider network, an NAI associated with the first application is authenticated, and then the first data service begins. Thereafter, when the user activates a second application for a second data service, an NAI associated with the second application is authenticated, and then the second data service begins.

When switching from the first application to the second application, the mobile station may deactivate protocol programs providing a communication link between the first application and the access provider network, and activate new protocol programs to create a communication link between the second application and the access provider network. In this case, repeated activation and deactivation of protocol programs for creation and release of communication links between applications and the access provider network may unnecessarily delay switching between applications.

SUMMARY OF THE INVENTION

The present invention provides a method and system for rapid application switching wherein authentication and registration of network access identifiers may be performed while protocol programs remain in a continuously activated state so as to enable rapid switching between data service applications.

Additional features of the invention will be set forth in the description which follows, and in part will be apparent from the description, or may be learned by practice of the invention.

The present invention discloses a system for rapid application switching, including a mobile station and a mobile communication network. The mobile station stores a multi-layered protocol stack of protocol programs and a plurality of applications having assigned network access identifiers (NAI), and executes a selected application at an application layer of the protocol stack. The mobile communication network communicates with the mobile station and performs NAI authentication and registration to provide the mobile station with a data service. The mobile station sends request messages for NAI deregistration, authentication, and registration, and receives corresponding response messages, without deactivation of the protocol programs below the application layer for a period of time after deregistration.

The present invention also discloses a method of rapid application switching for a mobile station. The mobile station includes a multi-layered protocol stack of protocol programs, a first application and a second application executable at an application layer of the protocol stack, and a first network access identifier (NAI) and a second NAI assigned to the first application and the second application, respectively. The method includes authenticating, in response to selection of the first application, the first NAI using an authentication server, registering the first NAI using a home agent, selecting the second application for execution as an application switching request. The method further includes deregistering, upon detection of the application switching request, the first NAI using the home agent without deactivating the protocol programs below the application layer for a period of time after deregistration, authenticating the second NAI using the authentication server, and registering the second NAI using the home agent.

The present invention also discloses a mobile station including a memory unit, an input unit, a radio frequency unit, and a control unit. The memory unit stores a multi-layered protocol stack of protocol programs, a first application and a second application executable at an application layer of the protocol stack, and a first network access identifier (NAI) and a second NAI assigned to the first application and the second application, respectively, for authentication and registration. The input unit generates a key signal to select the second application as an application switching request after execution of the first application. The radio frequency unit sends and receives a message using protocol programs of the protocol stack. The control unit controls, upon detection of the application switching request, NAI authentication and registration so that the first NAI registered at an external agent is deregistered, and then the second NAI is authenticated by an external server and registered at the external agent without deactivation of the protocol programs below the application layer for a period of time after deregistration.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

FIG. 6 is a sequence diagram showing messages exchanged according to the method of FIG. 5.

Figure 1:
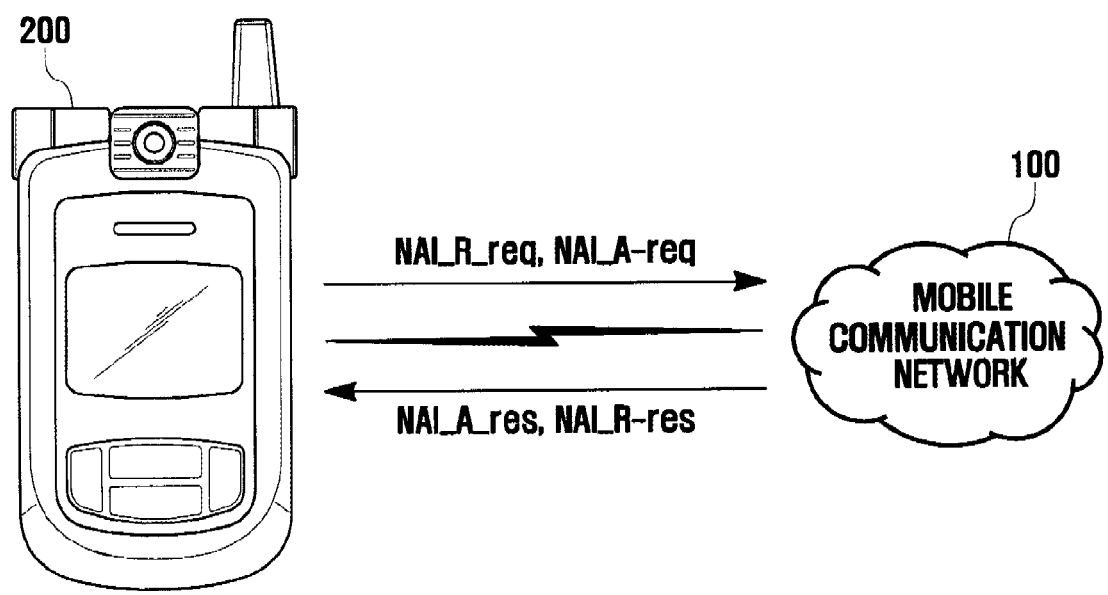
FIG. 1 shows a system for rapid application switching according to an exemplary embodiment of the present invention.

DETAILED DESCRIPTION OF THE
ILLUSTRATED EMBODIMENTS

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

The mobile station of the present invention is a terminal that uses network access identifiers, and may be any information and communication appliance or multimedia appliance, such as a mobile communication terminal, a digital broadcast receiving terminal, a personal digital assistant (PDA), a smart phone, an international mobile telecommunications 2000 (IMT 2000) terminal, a wideband code division multiple access (WCDMA) terminal, a global system for mobile communications (GSM) terminal, a universal mobile telecommunications system (UMTS) terminal, and a GSM/general packet radio services (GPRS) terminal.

FIG. 1 shows a system for rapid application switching according to an exemplary embodiment of the present invention.

Referring to FIG. 1, the system includes a mobile station 200 and a mobile communication network 100. The mobile station 200 and the mobile communication network 100 establish a communication channel to provide a data service requested by the user, using a network access identifier (NAI).

To establish a communication channel, each of the mobile station 200 and the mobile communication network 100 manages a layered protocol stack of multiple protocols. In the present invention, NAI registration and deregistration caused by switching between service providing applications (or switching between network access identifiers associated with individual applications) are performed while protocol programs remain in a continuously activated state in the mobile station 200. That is, an application in the mobile station 200 is switched without deactivating protocol programs below the application layer for a preset time after termination or suspension of the previous application. Therefore, the time required for application switching may be reduced, which may enable rapid reception of a desired service.

Exchanged messages may include an NAI authentication request (NAI_A_req), an NAI authentication response (NAI_A_res), an NAI registration request (NAI_R_req), and an NAI registration response (NAI_R_res).

Figure 2:
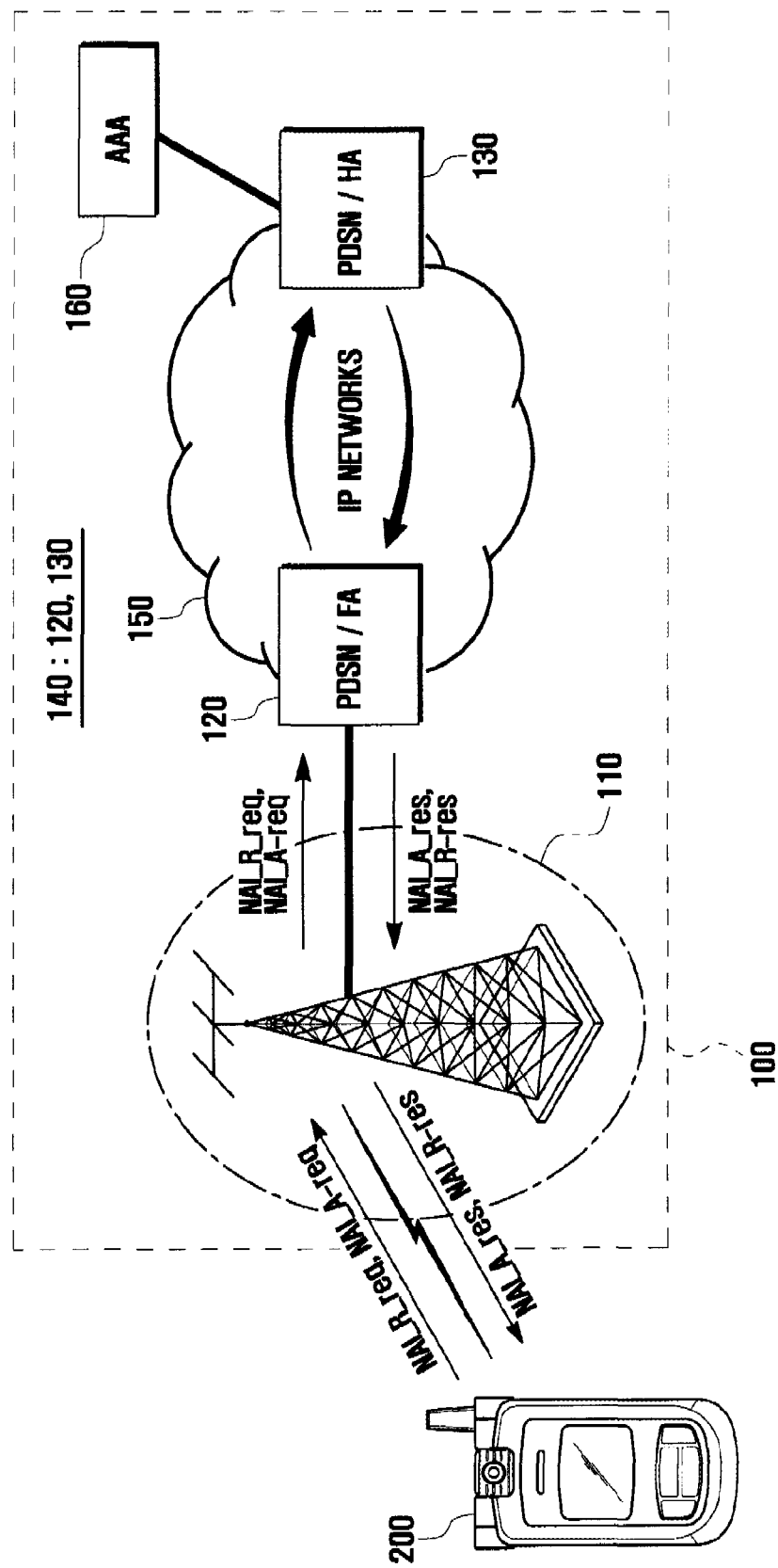
FIG. 2 shows a configuration of a mobile communication network in the system of FIG. 1.

FIG. 2 shows a configuration of the mobile communication network 100 in the system of FIG. 1.

Referring to FIG. 2, the mobile communication network 100 includes a radio access network (RAN) 110, Internet Protocol (IP) networks 150, packet data serving nodes (PDSN) 140, and an authentication/authorization/accounting (AAA) server 160. Packet data serving nodes 140 may act as a home agent (HA) (for example, PDSN/HA 130), and as a foreign agent (FA) (for example, PDSN/FA 120) according to the movement of the mobile station 200.

The radio access network 110 creates a logical point-to-point link between the mobile station 200 and the PDSN/FA 120 through, for example, a generic routing encapsulation (GRE) protocol for a data call after basic authentication. In particular, the radio access network 110 relays message transmission between the mobile station 200 and PDSN/FA 120 for NAI authentication, registration, and deregistration.

The packet data serving node 140 establishes a point-to-point (PPP) link to the mobile station 200 according to the PPP protocol, and exchanges authentication and accounting information with a Remote Authentication Dial In User Service (RADIUS) server using an NAI. The packet data serving node 140 performs PPP framing and byte stuffing to convert IP datagram data into PPP packet data, and also performs PPP de-framing and byte de-stuffing to convert PPP packet data into IP datagram data. The packet data serving node 140 may act as the home agent or as a foreign agent according to the location of the mobile station 200.

When the mobile station 200 moves to a foreign network, the PDSN/FA 120 of the foreign network assigns a care of address (COA) to the mobile station 200. The COA may be an IP address of the PDSN/FA 120 or a temporary IP address. While the mobile station 200 is in the coverage area, the PDSN/FA 120 supplies routing services to the mobile station 200. The PDSN/FA 120 detunnels a datagram, tunneled by the PDSN/FA 120, and forwards the datagram to the mobile station 200. The PDSN/FA 120 provides a default routing service to the mobile station 200 to permit the mobile station 200 to send a datagram.

In particular, the PDSN/FA 120 performs operations related to switching between applications, which may be MIP-based applications, simple Internet Protocol (SIP)-based applications, push to talk (PTT) based applications, video telephony applications, and web-based applications. NAI authentication, registration, and deregistration for NAI switching are performed, while lower layer protocols remain in an activated state (including the PPP layer), through interworking between the PDSN/FA 120 and PDSN/HA 130 via the IP networks 150.

The PDSN/HA 130 is a mobility agent in the home network to which the mobile station 200 belongs. The PDSN/HA 130 manages the current COA of the mobile station 200, and tunnels a datagram to the foreign network to which the mobile station 200 currently belongs.

In particular, the PDSN/HA 130 registers and deregisters network access identifiers associated with applications activated at the mobile station 200. For example, when the user of the mobile station 200 activates an MIP-based application, the mobile station 200 requests the PDSN/HA 130 to register a network access identifier associated with the activated MIP-based application. Upon deactivation of the MIP-based application, the mobile station 200 requests the PDSN/HA 130 to deregister the registered network access identifier. Further, if another application (for example, a PTT-based application) is activated within a preset time after deactivation of the MIP-based application, the mobile station 200 requests the PDSN/HA 130 to register a network access identifier associated with the newly activated PTT-based application without deactivating lower layer protocols. The preset time is set to a value suitable for efficient application switching. The preset time value may be set differently according to a user's selection or a user setting a mobile communication terminal.

The IP networks 150 interconnect the PDSN/HA 130 and the PDSN/FA 120 to relay datagrams.

The AAA server 160 provides user authentication and authorization services and maintains usage records for accounting, using standardized procedures according to a standard RADIUS protocol. In particular, the AAA server 160 authenticates network access identifiers allocated to the mobile station 200. For example, when the user of the mobile station 200 activates an application, a network access identifier associated with the application is authenticated by the AAA server 160. The user may receive a network service delivered by the application after successful authentication. Service providing applications are pre-stored in the mobile station 200.

Figure 3:
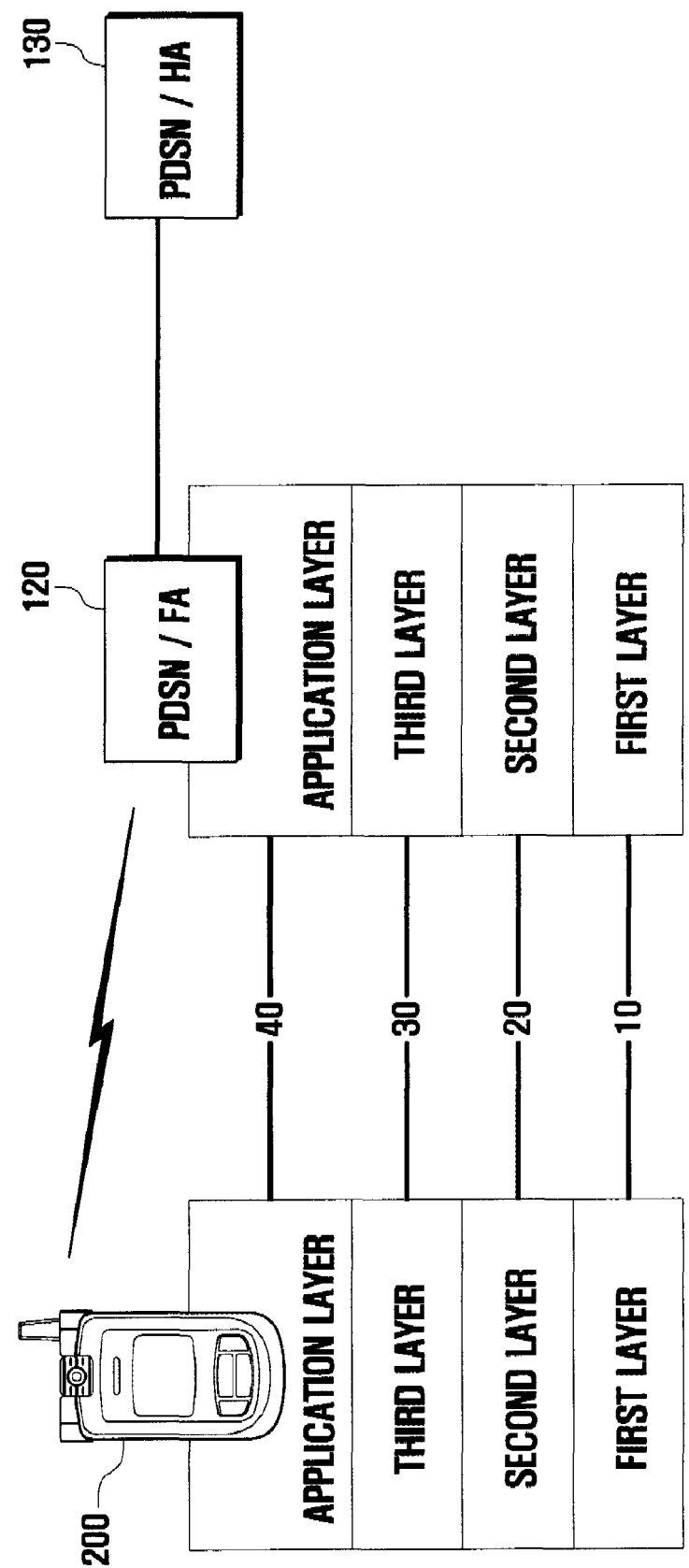
FIG. 3 shows a layered protocol architecture in the system of FIG. 1.

FIG. 3 shows a layered protocol architecture in the system of FIG. 1.

Referring to FIG. 3, the protocol architecture includes a first layer 10, a second layer 20, a third layer 30, and an application layer 40. The protocol architecture may include three or more layers as long as NAI authentication, registration, and deregistration may be performed without deactivating layers other than the topmost layer.

The first layer 10 corresponds to a physical layer, and provides a wireless link having a predetermined data rate and quality level. At the first layer 10, various functional channels are defined including a broadcast control channel (BCCH), a common control channel (CCCH), a user packet channel (UPCH), an associated control channel (ACCH), a dedicated control channel (DCCH), and a traffic channel (TCH).

The second layer 20 includes a lower media access control (MAC) layer and an upper link access control (LAC) layer. The MAC layer controls wireless links at the physical layer, and passes downward data to wireless links. Some functions of the MAC layer may correspond to the physical layer. The LAC layer creates, manages, and releases a logical link corresponding to a call initiated by the user.

The third layer 30 corresponds to a PPP layer, and provides a PPP link between the mobile station 200 and the mobile communication network 100. In establishing the link, the third layer 30 may perform packet header compression and may support authentication using a password authentication protocol (PAP) or challenge handshake authentication protocol (CHAP). The third layer 30 may also support an Internet Protocol Control Protocol (IPCP) to automatically assign an IP address to a client personal computer that tries to connect to a remote local area network. The Transmission Control Protocol/Internet Protocol (TCP/IP) may provide functionalities of the third layer 30.

The application layer 40 provides user-oriented functions such as a graphic user interface (GUI), and supports various application programs such as MIP-based applications, web-based applications, SIP-based applications, and PTT-based applications. A network access identifier may be allocated to a single application or to multiple applications. For the purpose of description, an application is assumed to be assigned a single network access identifier.

The application layer 40 supports NAI authentication, registration, and deregistration in such a manner that the user can switch applications without deactivating lower layers including the PPP layer, the link layer, and the physical layer. Hence, application switching or NAI switching may be rapidly performed.

Figure 4:
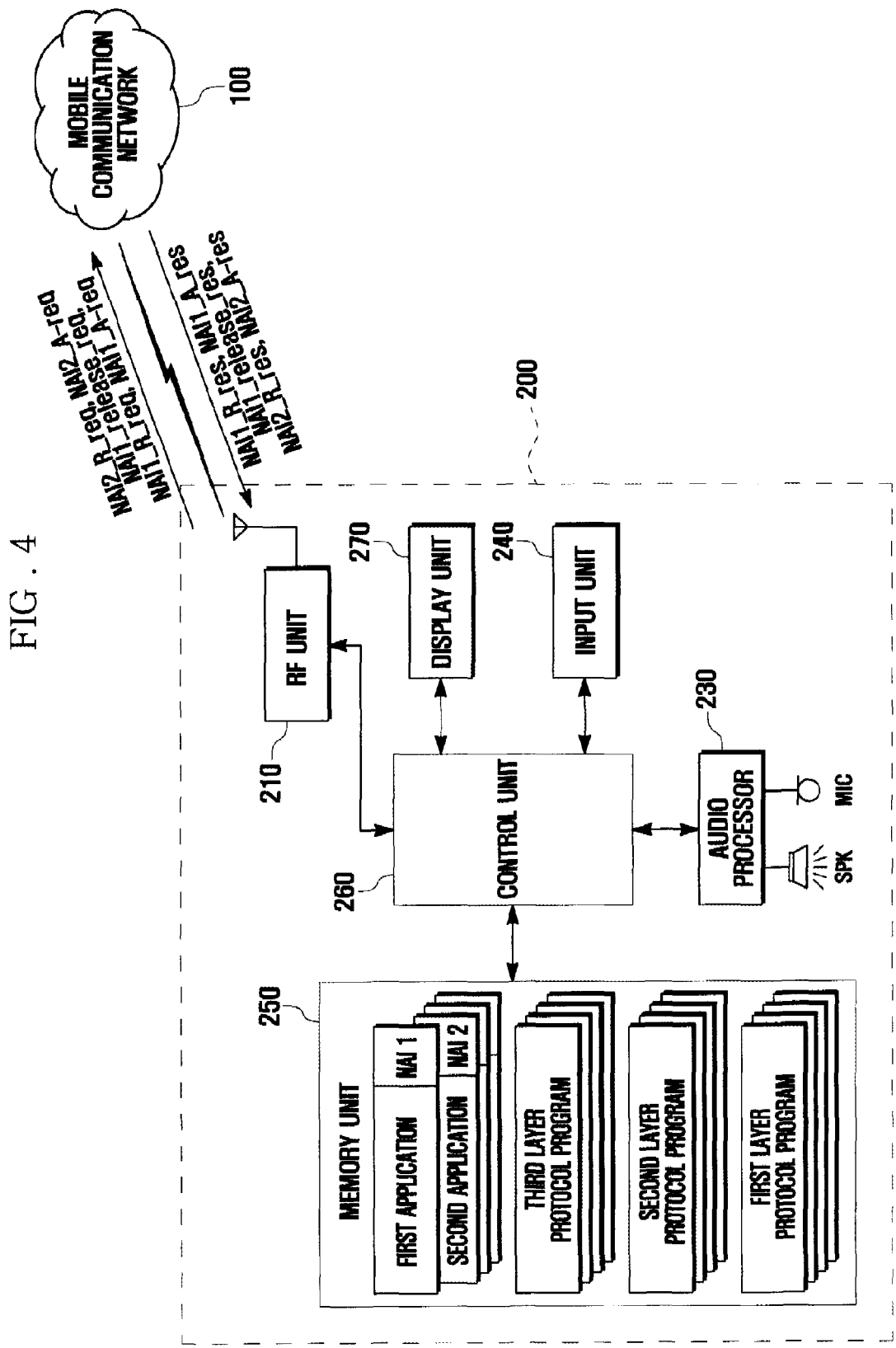
FIG. 4 shows a configuration of a mobile station in the system of FIG. 1.

FIG. 4 shows a configuration of the mobile station 200 in the system of FIG. 1.

Referring to FIG. 4, the mobile station 200 includes a radio frequency (RF) unit 210, an audio processor 230, an input unit 240, a memory unit 250, a display unit 270, and a control unit 260.

The RF unit 210 performs communication operations related to phone calls, short message service (SMS) or multimedia message service (MMS), and data services. The RF unit 210 includes an RF transmitter for up-converting the frequency of a signal to be transmitted and amplifying the signal, and an RF receiver for low-noise amplifying a received signal and down-converting the frequency of the signal.

In particular, the RF unit 210 establishes a wireless communication channel with the mobile communication network 100, and transmits and receives signals related to the execution of application programs. The RF unit 210 may correspond in function to the first layer or physical layer of the protocol architecture. The wireless communication channel may be established using various techniques, such as code division multiple access (CDMA), frequency division multiple access (FDMA), time division multiple access (TDMA), wideband CDMA (WCDMA), portable Internet or wireless broadband Internet (WiBro), universal mobile telecommunications system (UMTS), and orthogonal frequency division multiple access (OFDMA). The wireless communication channel may also be established using a combination of these techniques (for example, CDMA and WiBro).

The audio processor 230 reproduces an audio signal from an activated application through a speaker SPK, and collects an audio signal to be input to an activated application through a microphone MIC.

The input unit 240 generates a signal to select an application for activation according to a user command and a signal to select a menu item of the mobile station 200 and to input necessary information. Then the input unit 240 transmits the generated signals to the control unit 260.

The memory unit 250 stores a protocol stack of the mobile station 200 for data communication. The control unit 260 activates protocols in the protocol stack to establish a data connection to the PDSN/FA 120. The memory unit 250 also stores data coming from the mobile communication network 100, according to activation of an application, and user information. The memory unit 250 may include a program memory section and a data memory section.

The program memory section stores control programs to control the overall operation of the mobile station 200 and protocol elements for data communication. The protocol elements may include protocol programs for the first, second, third, and application layers, and support routines and routing information.

The data memory section stores data, resulting from execution of protocol programs and service providing applications, and parameter setting information for the user.

The display unit 270 displays menu screens and operations of the mobile station 200. The display unit 270 displays output of an application. For example, when the user activates an IP-based application to connect to a website, the display unit 270 displays, in response to key signals from the input unit 240, a Website selection screen, a connection progress screen during a connection attempt, and webpages from the selected website after establishment of the connection in such a sequence. When the user activates a PTT application, the display unit 270 displays a phone number input through the input unit 240, as well as status screens indicating signal transmission, reception, and standby during the call.

The control unit 260 controls the overall operation of the mobile station 200. For example, the control unit 260 controls signal exchange between the RF unit 210, the audio processor 230, the input unit 240, the memory unit 250, and the display unit 270. The control unit 260 also controls the display of data related to supplementary functions and user requests, according to key signals from the input unit 240.

In particular, the control unit 260 activates applications, switches network access identifiers in response to user-initiated application switching, and sustains protocol states in protocol layers other than the application layer.

For example, when the user selects an application having an assigned network access identifier, the control unit 260 activates and executes the application by obtaining authentication of the network access identifier using the PDSN/HA 130, PDSN/FA 120, and AAA server 160.

The operations of the control unit 260 with regard to activation, execution, and switching of applications are described in detail below.

When the user selects a first application having a first network access identifier to receive an associated data service, the control unit 260 of the mobile station 200 obtains authentication of the first network access identifier by sending an NAI authentication request (NAI1_A_req) through the PDSN/FA 120 and PDSN/HA 130 to the AAA server 160, and receiving an NAI authentication response (NAI1_A_res) from the AAA server 160. The control unit 260 then registers the first network access identifier by sending an NAI registration request (NAI1_R_req) through the PDSN/FA 120 to the PDSN/HA 130, and receiving an NAI registration response (NAI1_R_res) from the PDSN/HA 130. Thereafter, the user may receive the data service delivered by the first application.

When the user deactivates or terminates the first application and selects a second application having a second network access identifier to receive another data service, the control unit 260 deregisters the first network access identifier by sending an NAI deregistration request (NAI1_release_req) through the PDSN/FA 120 to the PDSN/HA 130, and receiving an NAI deregistration response (NAI1_release_res) from the PDSN/HA 130. Then, the control unit 260 obtains authentication of the second network access identifier by sending an NAI authentication request (NAI2_A_req) through the PDSN/FA 120 and PDSN/HA 130 to the AAA server 160, and receiving an NAI authentication response (NAI2_A_res) from the AAA server 160. The control unit 260 then registers the second network access identifier by sending an NAI registration request (NAI2_R_req) through the PDSN/FA 120 to the PDSN/HA 130, and receiving an NAI registration response (NAI2_R_res) from the PDSN/HA 130. Thereafter, the user may receive the data service delivered by the second application.

The mobile station 200 may further include at least one of a camera module, a digital multimedia broadcast receiving module, and a music player module.

Figure 5:
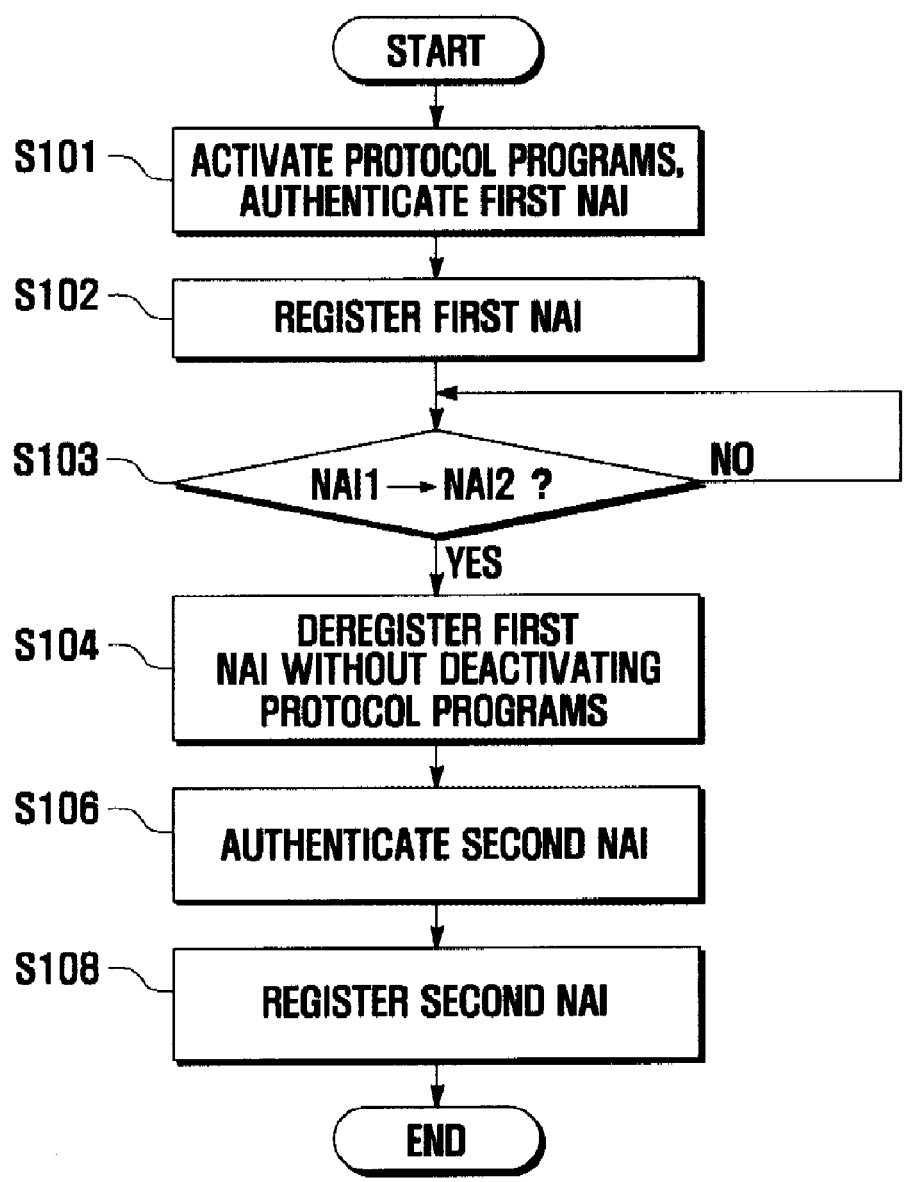
FIG. 5 is a flow chart showing an application switching method according to another exemplary embodiment of the present invention.

FIG. 5 is a flow chart showing a method for rapid application switching according to another exemplary embodiment of the present invention. FIG. 6 is a sequence diagram showing messages exchanged according to the method of FIG. 5.

In the following description, the mobile station 200 and the PDSN/FA 120 communicate with each other through a protocol stack including a first layer 10, a second layer 20, a third layer 30, and an application layer 40. The first layer 10, second layer 20, and third layer 30 may correspond respectively to a physical layer, a data link layer, and a PPP layer. Functionality of each layer may be supported by different protocol programs. A plurality of applications may be executed at the application layer 40. A first application and second application are associated with a first network access identifier and second network access identifier, respectively.

Referring to FIG. 5 and FIG. 6, when the user selects a first application having a first network access identifier to request a data service, the control unit 260 obtains authentication of the first network access identifier (S101). At step S101, the control unit 260 activates the necessary protocol programs belonging to the first, second, and third layers, and sends an NAI authentication request (NAI1_A_req) through the PDSN/FA 120 and PDSN/HA 130 to the AAA server 160. The AAA server 160 authenticates the first network access identifier, and sends an NAI authentication response (NAI1_A_res) through the PDSN/HA 130 and PDSN/FA 120 to the mobile station 200.

After successful authentication, the control unit 260 registers the first network access identifier (S102). At step S102, the control unit 260 sends an NAI registration request (NAI1_R_req) through the PDSN/FA 120 to the PDSN/HA 130. A message (for example, an NAI registration request) created by the mobile station 200 passes downward through the third, second, and first layer protocol programs, then passes upward through the first, second, and third layer protocol programs at the PDSN/FA 120, and arrives at the PDSN/HA 130 through the IP networks 150. The PDSN/HA 130 registers the first network access identifier, and sends an NAI registration response (NAI1_R_res) through the PDSN/FA 120 to the mobile station 200. After successful registration, the user receives the data service delivered by the first application.

When the user deactivates the first application and selects a second application having a second network access identifier to receive another data service, the control unit 260 switches applications (S103).

If the second application is activated within a preset time after deactivation of the first application, the protocol programs belonging to the first, second, and third layers remain in an activated state. That is, activated protocol programs belonging to the first, second, and third layers are deactivated only after the preset time expires and a further network access request is not received. This may enable rapid switching between data service applications.

For application switching, the control unit 260 terminates execution of the first application, and sends an NAI deregistration request (NAI1_release_req) through the PDSN/FA 120 to the PDSN/HA 130 (S104). The PDSN/HA 130 deregisters the first network access identifier, and sends an NAI deregistration response (NAI1_release_res) through the PDSN/FA 120 to the mobile station 200 (S105). After deregistration, protocol programs belonging to the first, second, and third layers remain activated.

After deregistration, the control unit 260 sends an NAI authentication request (NAI2_A_req) for the second network access identifier through the PDSN/FA 120 and PDSN/HA 130 to the AAA server 160 (S106). The AAA server 160 authenticates the second network access identifier, and sends an NAI authentication response (NAI2_A_res) through the PDSN/HA 130 and PDSN/FA 120 to the mobile station 200 (S107).

After successful authentication, the control unit 260 registers the second network access identifier (S108). At step S108, the control unit 260 sends an NAI registration request (NAI2_R_req) through the PDSN/FA 120 to the PDSN/HA 130. The PDSN/HA 130 registers the second network access identifier, and sends an NAI registration response (NAI2_R_res) through the PDSN/FA 120 to the mobile station 200. After successful registration, the user receives a data service delivered by the second application.

As apparent from the above description, the present invention provides a method and mobile station for rapid application switching wherein deactivation of protocol programs due to termination of a data service application is postponed for a preset time so as to enable the rapid startup of another data service application.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A method for rapid application switching for a mobile station, the mobile station comprising a multi-layered protocol stack of protocol programs, a first application and a second application executable at an application layer of the protocol stack, and a first network access identifier (NAI) and a second NAI assigned to the first application and the second application, respectively, the method comprising:
    authenticating, in response to selection of the first application, the first NAI using an authentication server;
    registering the first NAI using a home agent;
    selecting the second application for execution at an application switching request;
    deregistering, upon detection of the application switching request, the first NAI using the home agent without deactivating the protocol programs for a period of time after deregistration;
    authenticating the second NAI using the authentication server; and
    registering the second NAI using the home agent.

2. The method of claim 1, wherein authenticating the first NAI comprises:
    creating an authentication request for the first NAI;
    sending the authentication request through a foreign agent and the home agent to the authentication server; and
    receiving an authentication response from the authentication server.

3. The method of claim 1, wherein registering the first NAI comprises:
    creating a registration request for the first NAI;
    sending the registration request through a foreign agent to the home agent; and
    receiving a registration response from the home agent.

4. The method of claim 1, wherein deregistering the first NAI comprises:
    creating a deregistration request for the first NAI;
    sending the deregistration request through a foreign agent to the home agent; and
    receiving a deregistration response from the home agent.

5. The method of claim 1, wherein authenticating the second NAI comprises:
    creating an authentication request for the second NAI;
    sending the authentication request through a foreign agent and the home agent to the authentication server; and
    receiving an authentication response from the authentication server.

6. The method of claim 1, wherein registering the second NAI comprises:
    creating a registration request for the second NAI;
    sending the registration request through a foreign agent to the home agent; and
    receiving a registration response from the home agent.

7. The method of claim 6, wherein the mobile station and foreign agent communicate with each other through a radio access network, and the foreign agent and the home agent communicate with each other through an Internet Protocol network.

8. The method of claim 1, wherein the protocol stack comprises:
    a first layer corresponding to a physical layer;
    a second layer corresponding to a data link layer;
    a third layer supported by at least one of a point-to-point protocol and a Transmission Control Protocol/Internet Protocol (TCP/IP); and
    an application layer at which application programs are executed.

9. The method of claim 8, wherein each of the application programs utilizes at least one of a Mobile IP, a Simple IP, a push-to-talk protocol, a HyperText Transfer Protocol (HTTP), and a video telephony protocol.

10. A mobile station, comprising:
    a memory unit configured to store a multi-layered protocol stack of protocol programs, a first application and a second application executable at an application layer of the protocol stack, and a first network access identifier (NAI) and a second NAI assigned to the first application and the second application, respectively, for authentication and registration;
    an input unit configured to generate a key signal to select the second application as an application switching request after execution of the first application;
    a radio frequency unit configured to send and receive a message using protocol programs of the protocol stack; and
    a control unit configured to control, upon detection of the application switching request, NAI authentication and registration so that the first NAI registered at an external agent is deregistered, and then the second NAI is authenticated by an external server and registered at the external agent without deactivation of the protocol programs below the application layer for a period of time after deregistration.

11. The mobile station of claim 10, wherein the control unit creates and sends outgoing messages requesting registration and deregistration of the first NAI, and also creates and sends outgoing messages requesting authentication and registration of the second NAI.

12. The mobile station of claim 10, wherein the protocol stack comprises:
    a first layer corresponding to a physical layer;
    a second layer corresponding to a data link layer;
    a third layer supported by at least one of a point-to-point protocol and a Transmission Control Protocol/Internet Protocol (TCP/IP); and
    an application layer at which application programs are executed.

13. The mobile station of claim 12, wherein each of the application programs utilizes at least one of a Mobile IP, a Simple IP, a push-to-talk protocol, a HyperText Transfer Protocol (HTTP), and a video telephony protocol.

14. A system for rapid application switching, comprising:
    a mobile station configured to store a multi-layered protocol stack of protocol programs and a plurality of applications having assigned network access identifiers (NAI), and to execute a selected application at an application layer of the protocol stack; and a mobile communication network configured to communicate with the mobile station and perform NAI authentication and registration to provide the mobile station with a data service, wherein the mobile station sends request messages for NAI deregistration, authentication, and registration, and receives corresponding response messages, without deactivation of the protocol programs below the application layer for a period of time after deregistration.

15. The system of claim 14, wherein the mobile communication network comprises:
   a foreign agent configured to communicate with the mobile station;
   a home agent configured to communicate with the foreign agent to register an NAI; and
   an authentication server configured to communicate with the home agent to authenticate an NAI.

16. The system of claim 14, wherein the mobile station comprises:
   a memory unit configured to store the multi-layered protocol stack of protocol programs and applications having assigned NAIs;
   an input unit configured to generate a key signal corresponding to an application switching request;
   a radio frequency unit configured to send and receive a message to and from the mobile communication network using protocol programs of the protocol stack; and
   a control unit configured to control, upon detection of the application switching request, NAI authentication and registration so that a previously registered NAI is deregistered from the mobile communication network and then a new NAI is authenticated and registered by the mobile communication network without deactivation of the protocol programs for a period of time after deregistration.

* * * * *